United States Patent [19]

Maruoka

[11] Patent Number: 5,546,704
[45] Date of Patent: Aug. 20, 1996

[54] GLASS HOLDER

[75] Inventor: Hiroyuki Maruoka, Yokohama, Japan

[73] Assignee: NIFCO Inc., Japan

[21] Appl. No.: 404,324

[22] Filed: Mar. 15, 1995

[30] Foreign Application Priority Data

Mar. 24, 1994 [JP] Japan .................................. 6-053815

[51] Int. Cl.$^6$ ...................................................... B60J 1/00
[52] U.S. Cl. ............................................................ 49/375
[58] Field of Search ........................... 49/375, 374, 350, 49/351; 63/14.5

[56] References Cited

U.S. PATENT DOCUMENTS

| | | | |
|---|---|---|---|
| 2,945,363 | 7/1960 | Cataldi | 63/14.5 |
| 3,050,332 | 8/1962 | Arnold | 49/375 X |
| 4,026,088 | 5/1977 | Akabane | 49/351 X |
| 4,825,594 | 5/1989 | Escaravage | 49/351 |
| 4,840,045 | 6/1989 | Moody | 63/14.5 X |
| 4,987,699 | 1/1991 | Gold | 49/375 |
| 5,079,933 | 1/1992 | Alviti | 63/14.5 |

FOREIGN PATENT DOCUMENTS

| | | |
|---|---|---|
| 55-1261 | 1/1980 | Japan . |
| 418 | 1/1983 | Japan ........................... 49/375 |
| 417 | 1/1983 | Japan ........................... 49/375 |
| 46709 | 2/1987 | Japan ........................... 49/375 |
| 62-61719 | 4/1987 | Japan . |

*Primary Examiner*—Jerry Redman
*Attorney, Agent, or Firm*—Parkhurst, Wendel & Burr

[57] ABSTRACT

A glass holder which facilitates attachment of a door glass to a window regulator. The glass holder is assembled to an elevating member of the window regulator. The glass holder includes a first holding plate having a through hole, a second holding plate having a through hole and arranged to face the first holding plate so as to hold the door glass in cooperation with the first holding plate, a fastening member passed through a mounting hole formed in the door glass and the through holes formed in the first and second holding plates to fasten the door glass, and a hinge for pivotally connecting the second holding plate to the first holding plate to allow the second holding plate to form a holding space for holding the door glass.

7 Claims, 15 Drawing Sheets

GLASS HOLDER

BACKGROUND OF THE INVENTION

1. Field of the Invention

The present invention relates to a glass holder used to assemble a door glass to a window regulator of a vehicle which raises and lowers the door glass.

2. Description of the Related Art

In one type of window regulator for raising and lowering a door glass of a vehicle, a lower edge of a door glass is supported by a guide channel, which rests on tip ends of a pair of crossed arms. The door glass is raised and lowered by moving a guide channel.

Various types of glass holders for assembling the door glass to the guide channel have been proposed to facilitate the attachment of the door glass in an assembly line work process.

For example, a glass holder 114 shown in FIG. 14 includes a mounting plate 122 which is fixed to a guide channel 116 by a bolt 118 and a nut 120, and a holder portion 124 which extends from an upper portion of the mounting plate 122. The holder portion 124 is provided with a U-shaped elongated groove 126, into which a lower edge of a door glass 12 is inserted and supported. The lower edge of the door glass 12 is fixed in the elongated groove 126 by using adhesive 128. (This structure is described in Japanese Utility Model Publication No. 55-1261).

However, in the glass holder 114, since the adhesive 128 is used to fix the door glass 12, the width of the elongated groove 126 must be set such that a gap between the door glass 12 and the holder portion 124 does not become too large. Accordingly, experience is needed in the work for assembling the door glass 12 as the door glass 12 must be inserted into a door panel through a narrow clearance to be fit into the elongated groove 126 of the holder portion 124.

Further, the work for assembling the door glass 12 requires a step for applying the adhesive 128 in the elongated groove 126. Moreover, the door glass 12 cannot be securely held only by the adhesive force of the adhesive 128.

To resolve the above-described drawbacks, the mechanism shown in FIG. 15 has been proposed, wherein a mounting hole 130 is formed in a door glass 12, and the door glass 12 and a glass holder 115 are integrally fixed to a guide channel 116 by a bolt 140 and a nut 142, thereby increasing the door glass holding performance (refer to Japanese Utility Model Application Laid-Open No. 62-61719).

The glass holder 115 includes a first holding plate 132 having an L-shaped cross section, and a second holding plate 136 which is pivotably connected to an edge portion of a bottom surface 132A of the first holding plate 132. The first and second holding plates 132 and 136 are respectively provided with bolt holes 138 which are coaxially aligned with each other when the second holding plate 136 is pivoted upward so as to oppose the first holding plate 132.

The assembly of the door glass is carried out in the following manner. A lower edge of the door glass 12 is supported on and brought into contact with the bottom surface 132A of the first holding plate 132. The second holding plate 136 is thereafter pivoted upward so that the lower edge of the door glass 12 is held by the first and second holding plates 132 and 136. The bolt 140 is then inserted into the bolt holes 138 and the mounting hole 130. Subsequently, the tip of the bolt 140 is passed through an engagement hole 144 formed in the guide channel 116, and the bolt 140 is screwed into the nut 142 for fastening.

However, since assembly of the glass holder 115 requires an operation for manually pivoting the second holding plate 136 upward over an angle of 180 degrees, the speed of the assembly work is not increased. Moreover, since the glass holder 115 is not temporarily fixed to the guide channel 116, the glass holder 115 must be fixed to the guide channel 116 while the glass holder 115 is manually supported.

SUMMARY OF THE INVENTION

The present invention has been accomplished by taking the above-mentioned drawbacks into consideration, and an object of the present invention is to provide an improved glass holder which facilitates assembly of a door glass to a window regulator.

A first aspect of the present invention is a glass holder which is assembled to an elevating member of a window regulator which raises and lowers a door glass. The glass holder includes a first holding plate which has a through hole, a second holding plate which has a through hole and is arranged to oppose the first holding plate so that the sides of the door glass are held by the first and second holding plates, a fastening member which is inserted into a mounting hole formed in the door glass and into both of the through holes of the first and second holding plates to fasten the door glass, and a hinge for pivotally connecting the second holding plate to the first holding plate to allow the second holding plate to form a holding space for holding the door glass.

A second aspect of the present invention is a glass holder which is assembled to an elevating member of a window regulator which raises and lowers a door glass, wherein the side surfaces of the door glass are held by first and second holding plates, and the door glass is fastened with a fastening member which is passed through a mounting hole formed in the door glass and through the through holes formed in the first and second holding plates. Moreover, the first and second holding plates are connected to each other via an urging hinge member so as to form a holding space for holding the door glass, wherein the urging hinge member produces a force which causes the second holding plate to pivot toward the first holding plate.

A third aspect of the present invention is a glass holder which is assembled to an elevating member of a window regulator which raises and lowers a door glass, wherein the side surfaces of the door glass are held by first and second holding plates, and the door glass is fastened with a fastening member which is passed through a mounting hole formed in the door glass and through the through holes formed in the first and second holding plates. The glass holder further includes a hinge for pivotally connecting the second holding plate to the first holding plate to form a holding space for holding the door glass, and an engagement tongue which protrudes from the center of rotation of the second holding plate toward the holding space such that the second holding plate is pivoted toward the first holding plate when the engagement tongue is pressed by the lower edge of the door glass.

The glass holder according to the present invention may include an elastic claw which protrudes from the first holding plate and is engageable with a positioning hole formed in the elevating member so that the door glass is temporarily retained, thereby coaxially aligning the mounting hole formed in the elevating member with the through hole formed in the first holding plate.

In the first aspect of the glass holder according to the present invention, the second holding plate is pivotally connected, by the urging hinge member, to the first holding plate which is to be mounted to the elevating member.

Before mounting the door glass, the second holding plate is pivoted downward in a direction away from the first holding plate against the urging force of the urging hinge member. Due to this operation, the holding space for holding the door glass which is formed between the first and second holding plates is opened, i.e., the holding space is widened. Accordingly, a worker can easily insert door glass into the holding space while observing the state of the work operation.

When the second holding plate is subsequently raised, the second holding plate is pivoted toward the first holding plate due to the urging force of the urging hinge member, thereby holding the door glass in the holding space between the first and second holding plates. Then, the fastening member is passed through the mounting hole of the door glass and through the through holes of the first and second holding plates to fasten the door glass and the elevating member. The fastening member may fasten the glass holder to the elevating member together with the door glass. Further, it is also possible to fasten the glass holder to only the elevating member with another fastening means.

In the second aspect of the glass holder according to the present invention, the second holding plate is pivotally connected via the hinge to the first holding plate which is to be mounted to the elevating member. Further, the engagement tongue protrudes from the center of rotation of the second holding plate toward the holding space.

Before assembling the door glass, the second holding plate is pivoted downward in a direction away from the first holding plate. Due to this operation, the holding space is opened. When the engagement tongue is pressed downward by the lower edge of the door glass, a rotational moment corresponding to the arm length of the engagement tongue acts on the center of rotation of the second holding plate.

Accordingly, the second holding plate automatically pivoted toward the first holding plate to hold the door glass between the first and second holding plates. This eliminates the need for an operation to independently raise the second holding plate.

Further, in the third aspect of the glass holder according to the present invention, the elastic claw protrudes from the first holding plate. When the first holding plate is slid along the elevating member to the positioning hole, the elastic claw elastically deforms and then elastically recovers its original shape when the elastic claw reaches the positioning hole. With this operation, the first holding plate is temporarily retained to the elevating member, which eliminates the need for an operation for holding the glass holder by hand or by a tool or the like. With this temporary retainment of the glass holder, the mounting hole formed in the elevating member is axially aligned with the through hole formed in the first holding plate. Accordingly, the operation for aligning the holes can be eliminated.

DESCRIPTION OF THE PREFERRED EMBODIMENTS

Figure 1:
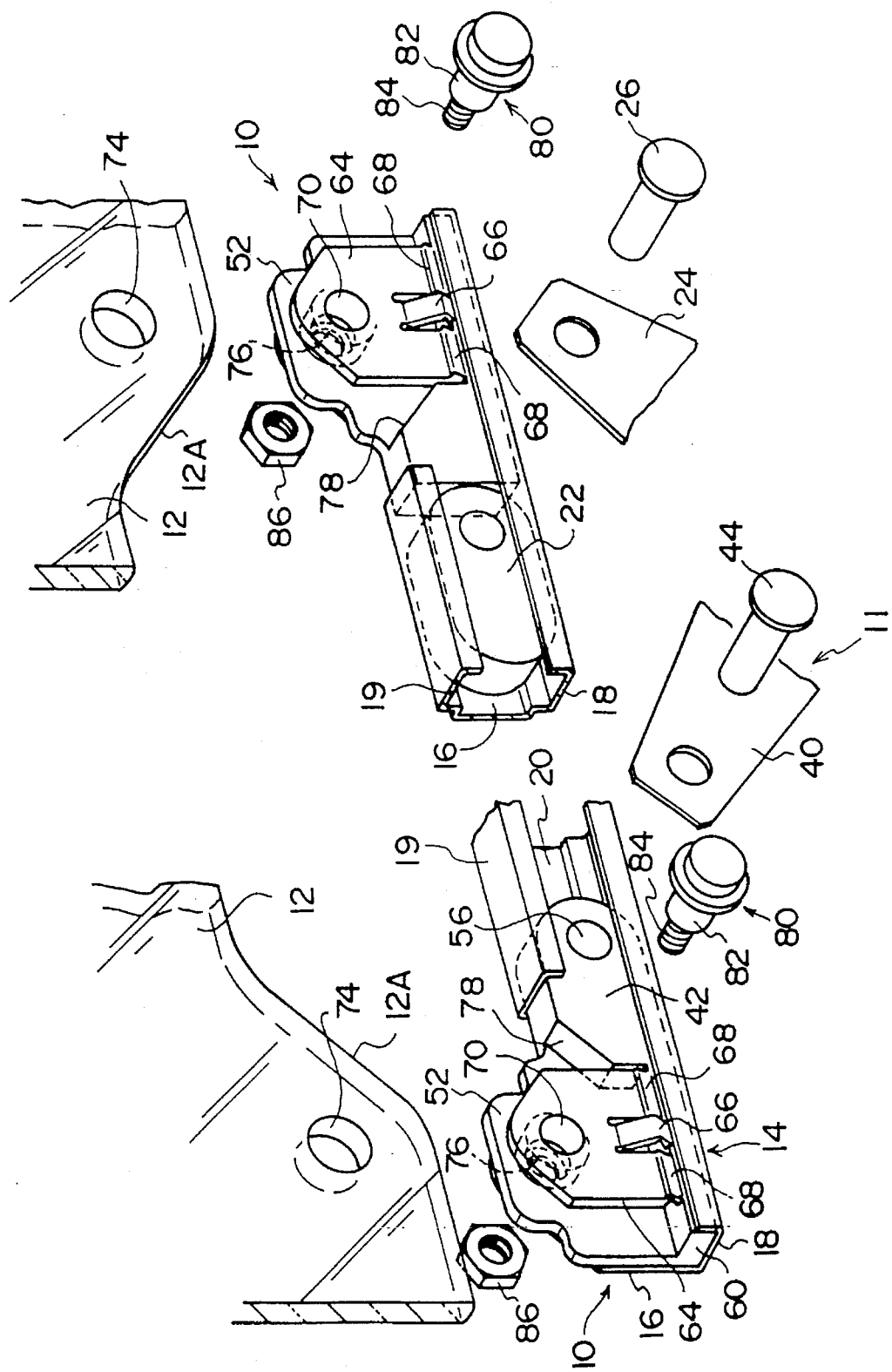
FIG. 1 is an exploded perspective view of a glass holder according to a first embodiment of the present invention.
Figure 2:
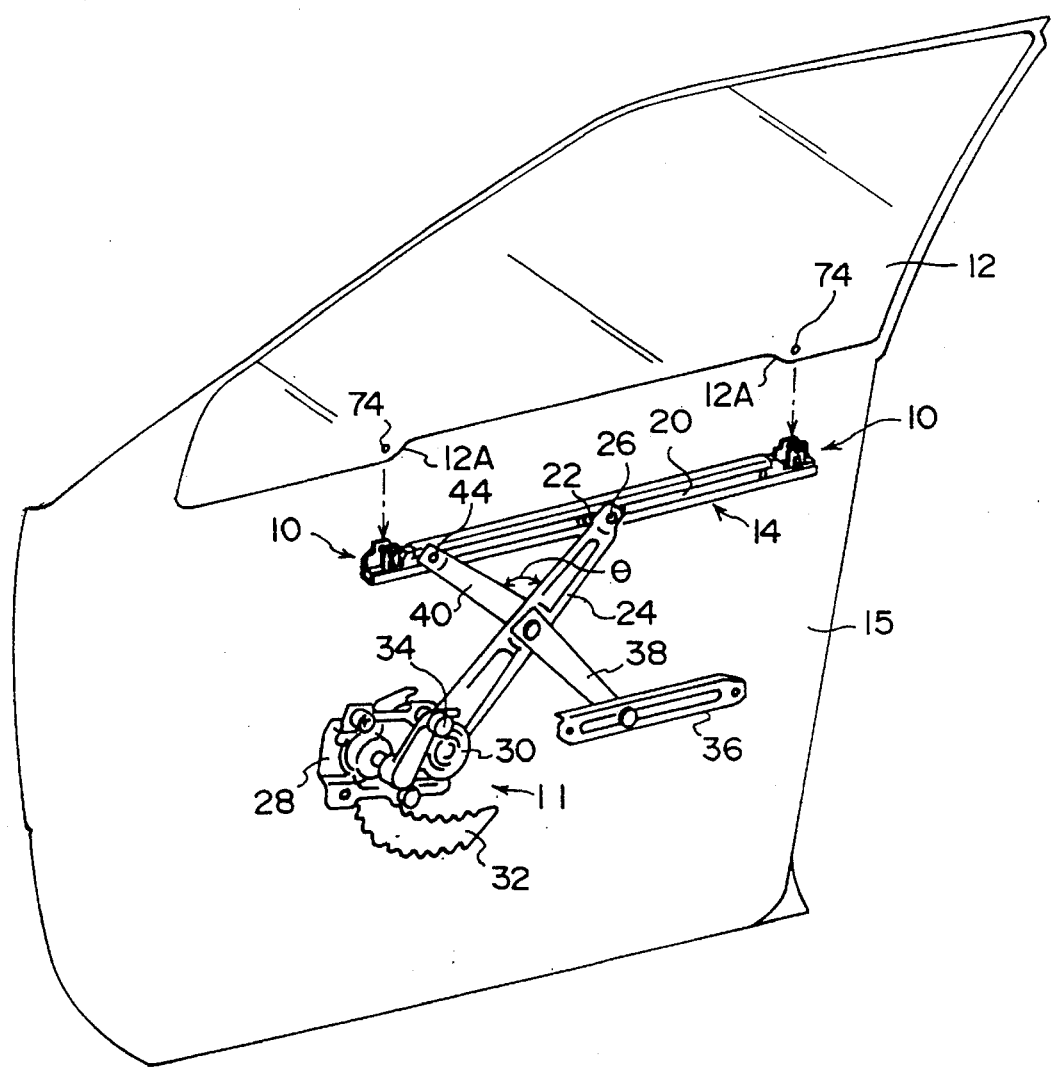
FIG. 2 is a perspective view of a window regulator to which the glass holder according to the first embodiment is assembled.

FIGS. 1 and 2 show a window regulator 11 to which glass holders 10 according to a first embodiment of the present invention are mounted.

The window regulator 11 is provided with a guide channel 14 which supports the lower edge of a door glass 12. The guide channel 14 is comprised of a base portion 16 which opposes a door panel 15, and a pair of upper and lower brackets 18, 19 perpendicularly extending from the upper and lower edges of the base portion 16. A guide groove 20 which opens toward a front side of the guide channel 14 (i.e., the side of the guide channel 14 opposite the door panel 15) is formed by the base portion 16 and the upper and lower brackets 18, 19. A block-shaped sliding member 22 is slidably fit into the right-hand end of the guide groove 20 in FIG. 1. The tip end of a lift arm 24 is pivotably connected to the sliding member 22 via a pin 26. The lift arm 24 is pivoted by a shaft member 30 on a mounting plate 28 which is fixed to the door panel 15. An arcuate driven gear 32 is provided at the distal end of the lift arm 24. A holder 34 is provided with an unillustrated pinion. The driven gear 32 is meshed with the unillustrated pinion. When an operational handle 34 is rotated by a vehicle occupant, the driven gear 32 is moved by rotation of the pinion and the lift arm 24 pivots around the shaft member 30.

An intermediate portion of the lift arm 24 is rotatably supported by an upper end portion of a supporting arm 38. A lower end portion of the supporting arm 38 is slidably supported to a guide rail 36 so as to be movable along the guide rail 36. A lower end portion of a follower arm 40 is pivoted at the portion at which the lift arm 24 and the supporting arm 38 are Joined. An upper end portion of the follower arm 40 is pivotably connected by a pin 44 to a connecting plate 42 which is integrally formed with the glass holder 10 which is disposed at a left side of the guide channel 14 as shown in FIG. 1.

Accordingly, when the lift arm 24 is driven, the sliding member 22 slidably fitted into the guide channel 14 moves along the guide groove 20, so that an angle (θ) is formed respectively between the lift arm 24 and the supporting arm 38, and the lift arm 24 and follower arm 40 are increased or decreased. As a result, the guide channel 14 is raised or lowered while its horizontal posture is maintained.

Figure 5:
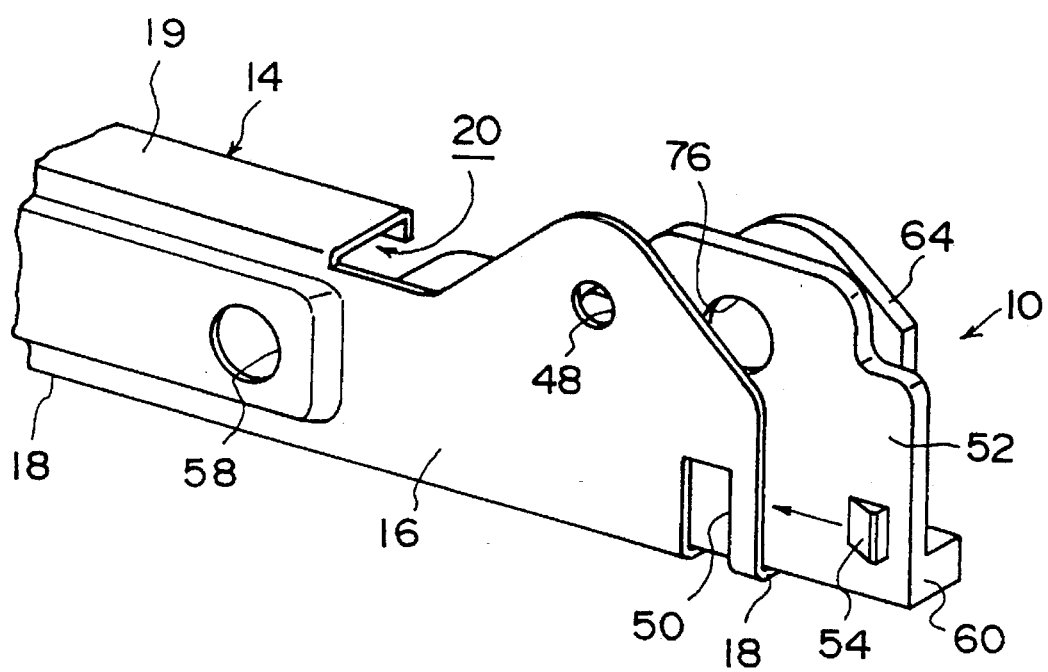
FIG. 5 is a perspective view of a rear portion of the glass holder according to the first embodiment.

As shown in FIG. 5, the side end portions of the upper bracket 19 of the guide channel 14 which receive the glass holders 10 are partially cut away at regions at which the base portion 16 is extended upward to form triangular portions. A mounting hole 48 is formed in the respective central portions of the triangular portions of the base portion 16. Further, a rectangular engagement hole 50 is formed at each side end portion of the base portion 16. An elastic claw 54 is provided so as to project from a back surface of a first holding plate 52 of the glass holder 10, and is engaged with the rectangular engagement hole 50.

As shown in FIG. 1, a through hole 56 is formed in a connecting plate 42 of the glass holder 10 which is disposed on the left side of the guide channel 14 in the drawings. Further, a mounting hole 58 is formed in the base portion 16 of the guide channel 14 as shown in FIG. 5. A pin 44 which penetrates through the upper end portion of the follower arm 40 is passed through the through hole 56 of the connecting plate 42 and through the mounting hole 58 so as to integrally connect the glass holder 10, the guide channel 14 and the follower arm 40.

Figure 3:
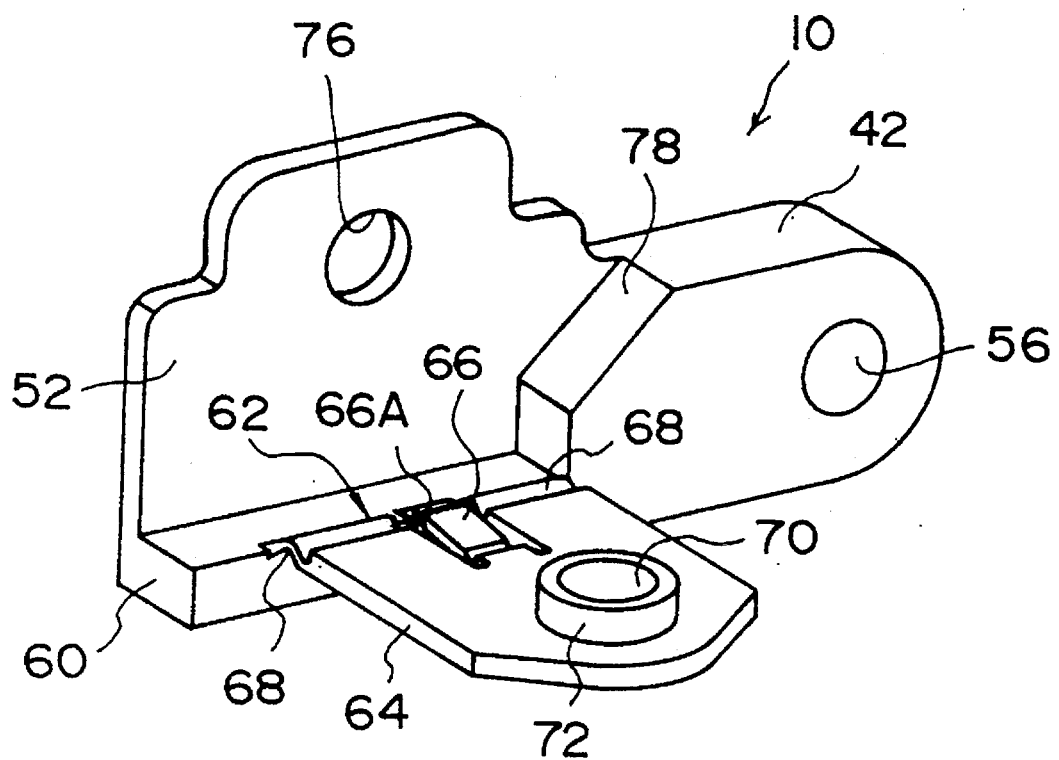
FIG. 3 is a perspective view of a front portion of the glass holder showing a state in which a holding plate is opened according to the first embodiment.

As shown in FIGS. 1 and 3, the glass holder 10 has the first holding plate 52 which is in close contact with the base portion 16, and a base 60 which is formed at the lower end portion of the first holding plate 52 and which is fitted into the groove of the lower bracket 18. A lower edge of the door glass 12 is placed on the base 60.

A second holding plate 64 is pivotably connected to a side edge of the base 60 by an urging hinge member 62. The urging hinge member 62 includes a leaf spring 66 and thin hinges 68 provided at both sides of the leaf spring 66. The leaf spring 66 is disposed at a C-shaped cut away portion provided at a lower center portion of the second holding plate 64 adjacent to a center of rotation of the second holding plate 64. The thin hinges 68 respectively have an L-shaped bent portion.

Figure 4:
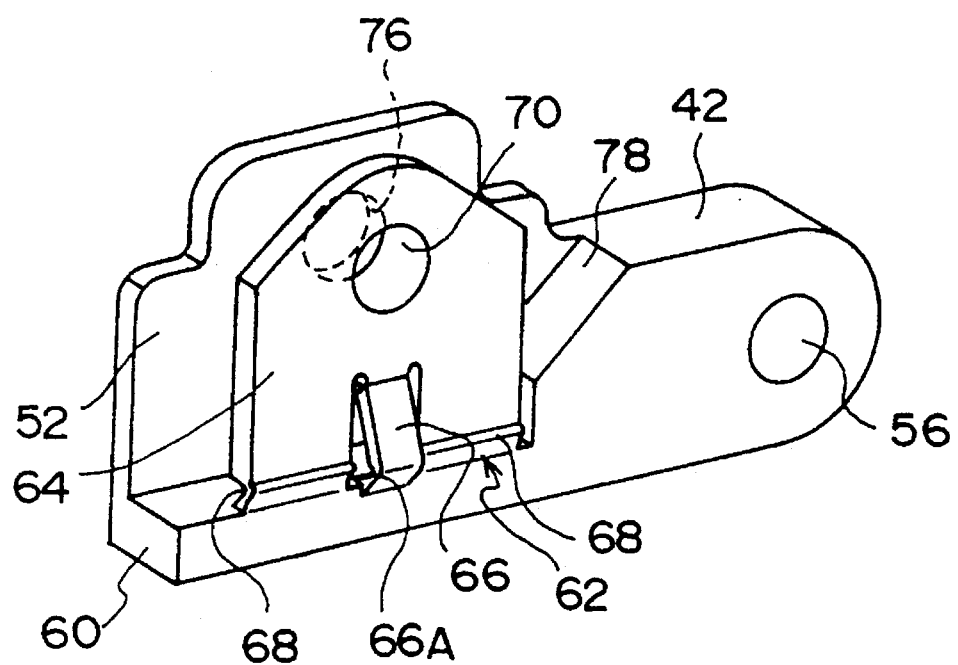
FIG. 4 is a perspective view of the front portion of the glass holder showing a state in which the holding plate is closed according to the first embodiment.

The upper and lower ends of the leaf spring 66 are bent and are made thinner than the substantially intermediate portion or the leaf spring 66, and are connected to the second holding plate 64 and the side edge of the base 60, respectively. The substantially intermediate portion of the leaf spring 66 is bent upward to form a bending portion 66A. The bending portion 66A is bent upward when the second holding plate 64 is pivoted downward with respect to the first holding plate 52 (the second holding plate 64 is pivoted downward by 90°) as shown in FIG. 3. Moreover, the bending portion 66A is bent outward when the second holding plate 64 is pivoted to an upright position as shown in FIG. 4. Due to the spring force of the bending portion 66A, the position of the second holding plate 64 may be varied by pivoting the second holding plate 64 upward (toward the first holding plate 52) or downward (away from the first holding plate 52).

Accordingly, when the second holding plate 64 is raised from its horizontal position by a predetermined amount (for example, about 45°), the bending portion 66A of the leaf spring 66, and the thin hinges 68 formed on both sides of the bending portion 66A are reversed, so that the second holding plate 64 is pivoted and raised toward the first holding plate 52 by the spring force.

Further, a bolt hole 70 is formed in the free end portion of the second holding plate 64. A boss 72 is formed around the bolt hole 70 on the side thereof which faces the first holding plate 52, and is ultimately inserted into a mounting hole 74 formed in the door glass 14. A bolt hole 76 is formed in an upper portion of the first holding plate 52. The bolt hole 76 is coaxially aligned with the bolt hole 70 when the door glass 12 is held by the first and second holding plates 52 and 64. Moreover, a slanted peripheral portion 12A is formed in a vicinity of the mounting hole 74 of the door glass 12. The slanted peripheral portion 12A inclined upwardly toward a central portion of the door glass 12. The slanted peripheral portion 12A closely contacts a guide surface 78 which is formed on the glass holder 10 and inclines toward the base 60, so that the mounting hole 74 of the door glass 12 and the bolt hole 76 of the first holding plate 52 are aligned with each other.

A stepped bolt 80 is inserted into the bolt holes 70 and 76 and the mounting hole 48 of the base portion 14. A large diameter portion 82 of the stepped bolt 80 is made of metal. Accordingly, looseness does not occur even if the compression performance of the glass holder 10 deteriorates over time.

A male screw portion 84 formed at a tip portion of the stepped bolt 80 is passed through the mounting hole 48 of the base portion 16 of the guide channel 14, and a nut 86 is screwed to the male screw portion 84.

Although the above-explanation describes the glass holder 10 which is disposed at the left side in FIG. 1, the glass holder 10 which is disposed at the right side has the same structure except that, at the right side, the connecting plate 42 is not integrally formed with the glass holder 10.

Next, steps for mounting the door glass 12 by using the glass holder 10 of the first embodiment will be described.

First, the base 60 of the glass holder 10 is inserted into the guide groove 20 from an end of the guide channel 14 where the upper bracket 19 is cut away. When the glass holder 10 is inserted along the guide groove 20, the elastic claw 54 is deformed and then recovers its original shape when the elastic claw 54 reaches the engagement hole 50, so that the elastic claw 54 is engaged with the engagement hole 50. In the temporarily retaining state of the door glass 12, the bolt hole 76 of the first holding plate 52 is aligned with the mounting hole 48 of the base portion 16, and the through hole 56 of the connecting plate 42 is aligned with the mounting hole 58 of the base portion 14, thereby completing alignment of the holes.

Figure 6:
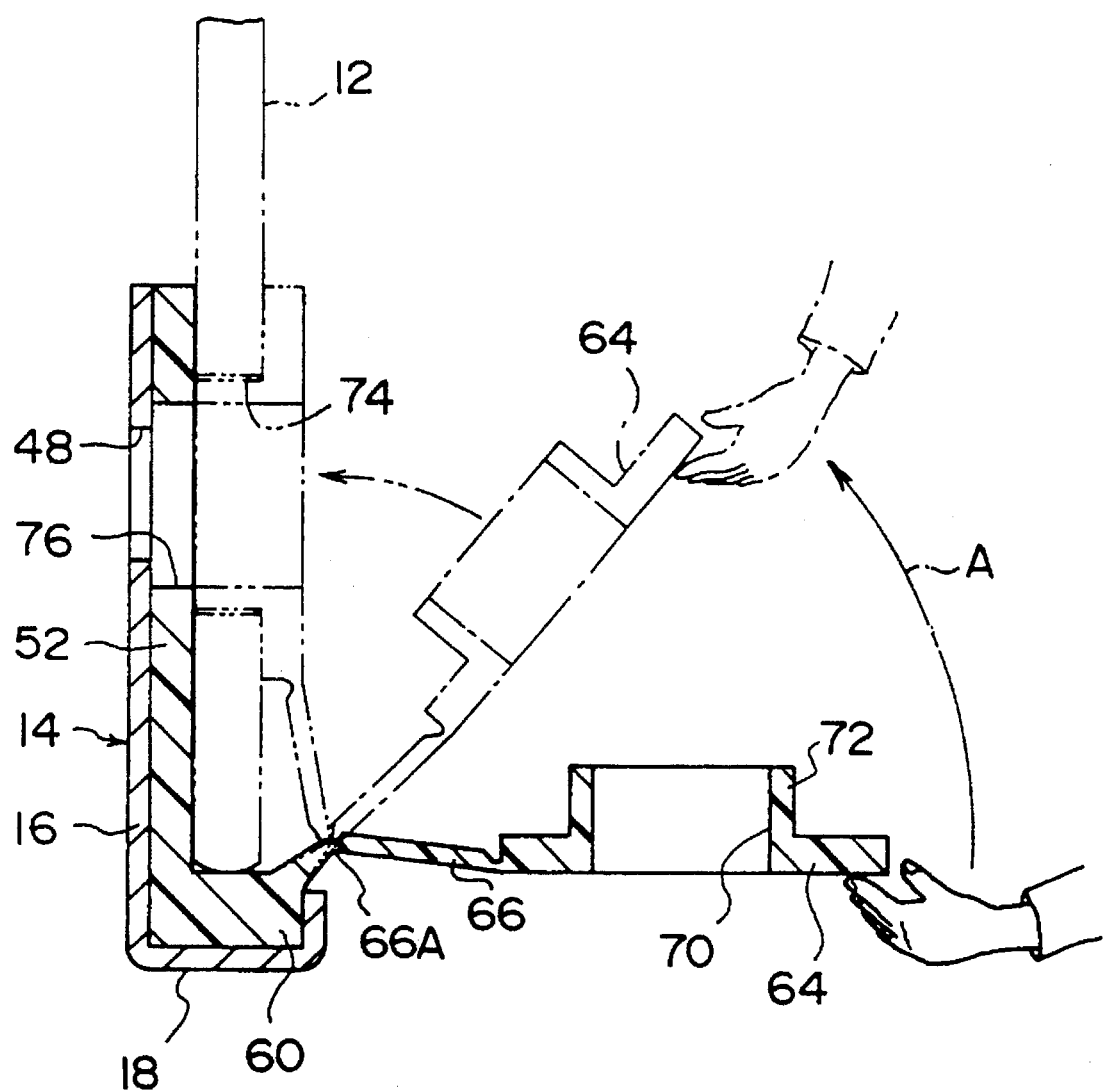
FIG. 6 is a sectional view showing a manner of mounting a door glass using the glass holder according to the first embodiment.

Next, the second holding plate 64 is pivoted downward to the open state illustrated in solid lines in FIG. 6, and the lower edge of the door glass 12 is positioned on the base 60 with the inclined guide surface 78 contacting the slanted peripheral portion 12A. Since the holding space formed between the first holding plate 52 and the second holding plate 64 is widened, a worker can insert the door glass 12 while watching the status of the operation.

When the second holding plate 64 is pushed upward in the direction of arrow A in FIG. 6, the bending portion 66A and the thin hinges 68 formed on both sides thereof are reversed toward the respective opposite sides. As a result, the second holding plate 64 is pressed against the door glass 12 by the urging force, and the boss 72 is fitted into the mounting hole 74 of the door glass 12.

Figure 7:
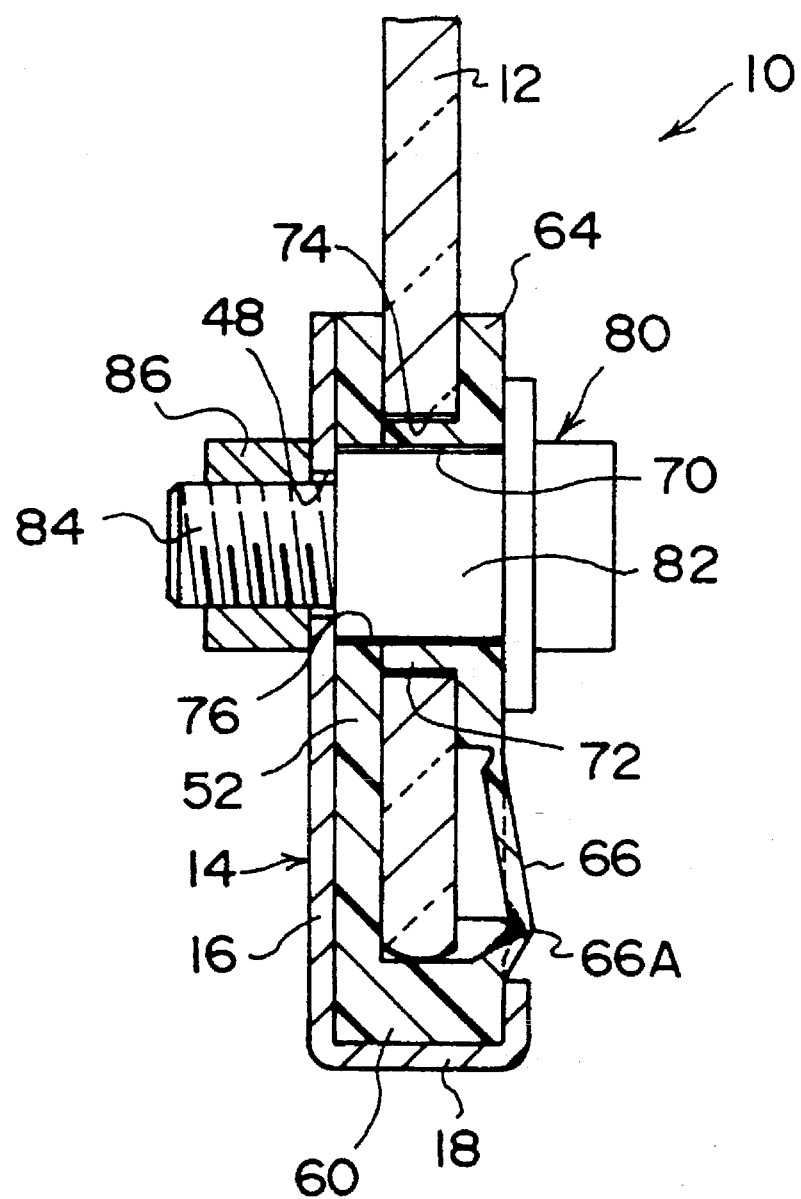
FIG. 7 is a sectional view showing a state in which assembly of the door glass by using the glass holder according to the first embodiment is completed.

Thereafter, as illustrated in FIG. 7, the stepped bolt 80 is inserted into the bolt hole 70, the mounting hole 74 of the door glass 12, the bolt hole 76 and the mounting hole 48. The nut 86 is screwed with the male screw portion 84 which has passed through the mounting hole 48.

As described above, in the glass holder according to the present invention, it is not necessary to forcibly raise the second holding plate 64 to a position of contact with a surface of the door glass 12. Accordingly, the fastening operation using the stepped bolt 80 can be carried out quickly.

Next, a glass holder 90 according to a second embodiment of the present invention is described.

Figure 8:
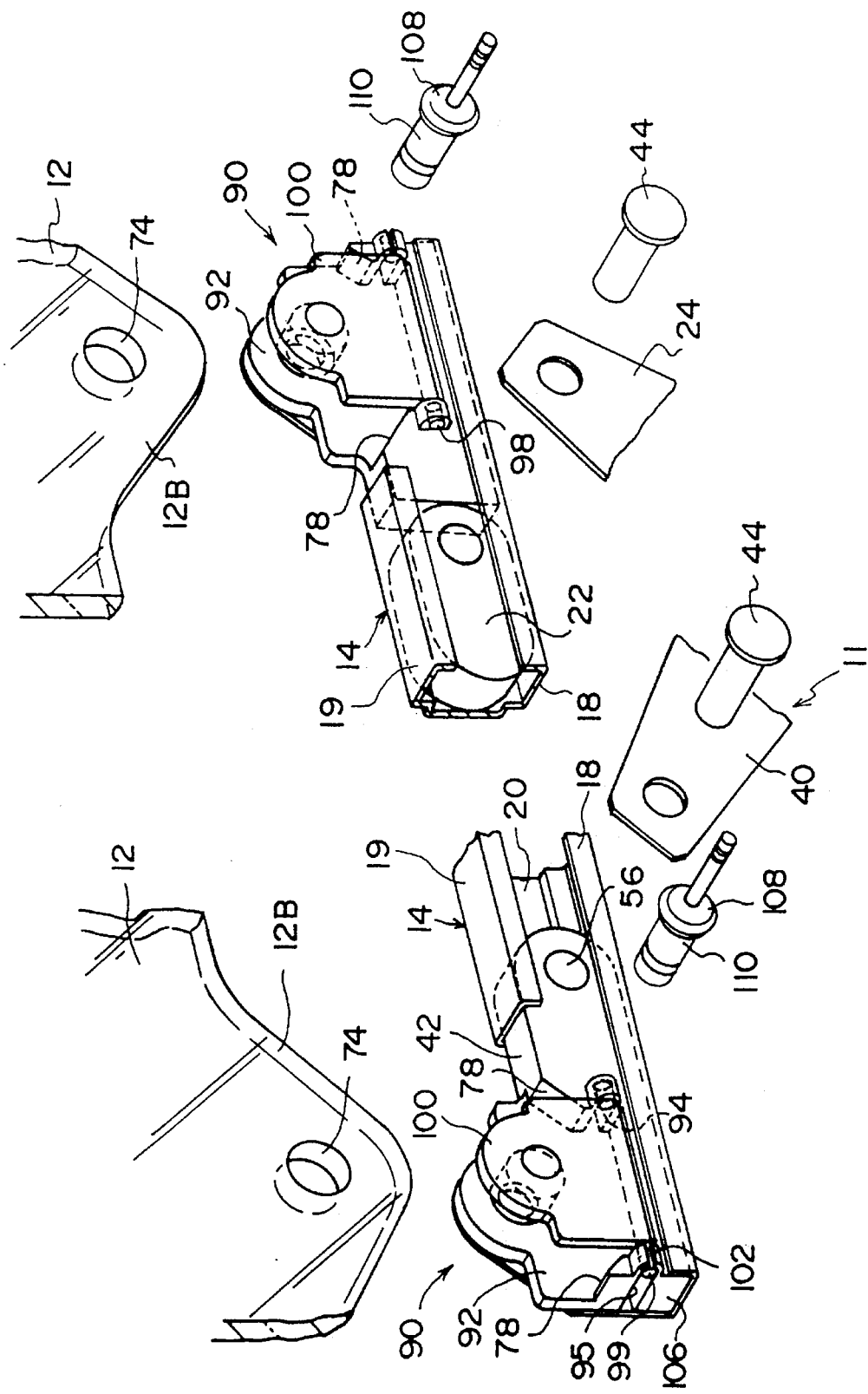
FIG. 8 is an exploded perspective view of a glass holder according to a second embodiment of the present invention.
Figure 9:
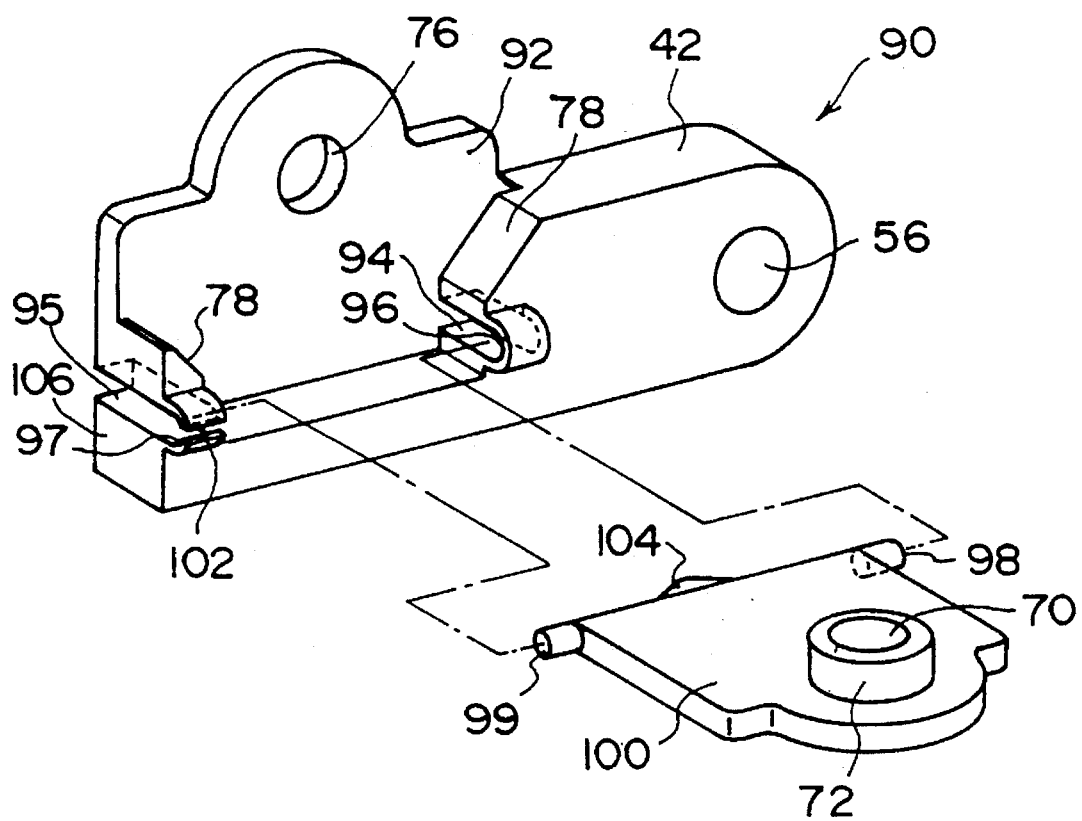
FIG. 9 is a perspective view of a front portion of the glass holder showing a state in which a holding plate is opened according to the second embodiment.
Figure 10:
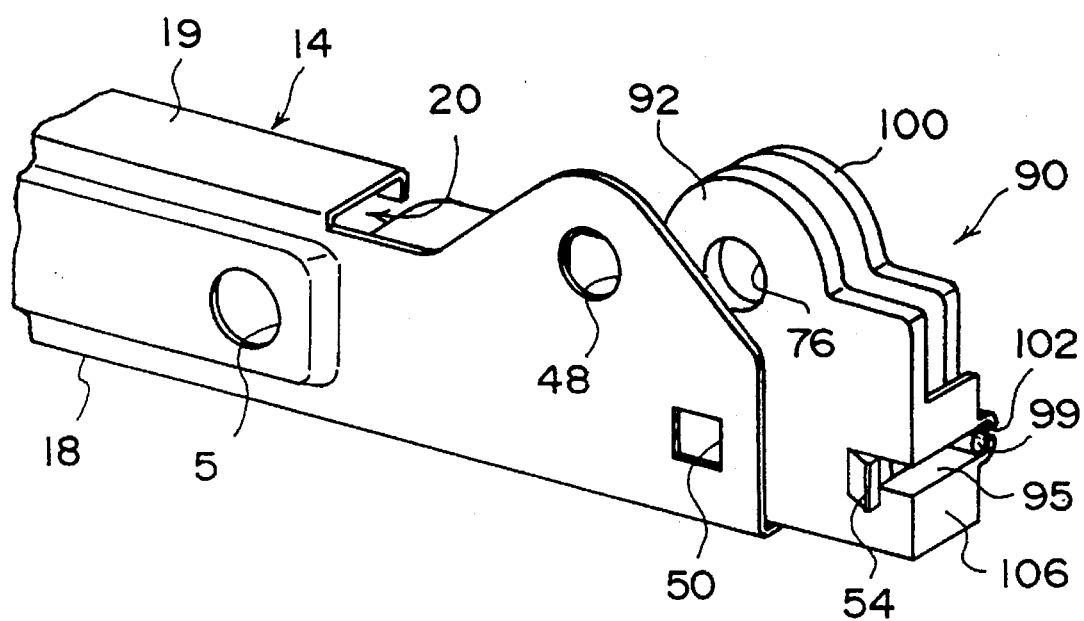
FIG. 10 is a perspective view of a rear portion of the glass holder according to the second embodiment.

As shown in FIGS. 8 through 10, the glass holder 90 of the second embodiment has a first elongated groove 94 and a second elongated groove 95 which are formed at the lateral ends of the lower part of a first holding plate 92. End portions of the elongated grooves 94, 95 (i.e. the end portions of the elongated grooves at the sides thereof opposite the first holding plate 92) are shaped as semicircles so as to form a first bearing portion 96 and a second bearing portion 97 which support respectively a first pin 98 and a second pin 99 protruding from lateral sides of a second holding plate 100 which will be described hereinafter. The first and second bearing portions 96, 97 protrude outward from a base 106 of the first holding plate 92 and are located slightly above the base 106. Accordingly, the second holding plate 100 is supported by the first and second bearing portions 96, 97 with a space formed between the second holding plate 100 and the base 106.

Further, a wall of the second elongated groove 95 is provided with a slit 102 which can be widened to receive the second pin 99.

The first and second pins 98, 99 project from the lateral sides of the base end portion of the second holding plate 100. An engagement tongue 104 extends from a lower intermediate portion of the second holding plate 100. The engagement tongue 104 has a length such that the engagement tongue 104 extends above the base 106 when the second holding plate 100 is in its open state, but does not abut an upper surface of the base 106 when the second holding plate 100 is pivoted upward.

Next, steps for mounting the door glass 12 by using the glass holder 90 according to the second embodiment will be described.

As shown in FIG. 9, the first pin 98 of the second holding plate 100 is inserted into the first bearing portion 96, and the second pin 99 is inserted into the second bearing portion 97 through the slit 102. Since the first holding plate 92 and the second holding plate 100 can be transported separately, the hinge portions are not damaged even in a case in which the glass holders are made of a synthetic resin such as glass-fiber reinforced polyacetal resin, or the like.

As shown in FIG. 10, the base 106 of the glass holder 90 is subsequently inserted into the guide groove 20 from the end of the guide channel 14 where the upper bracket 19 is cut away. As a result, the glass holder 90 is temporarily retained.

Figure 11:
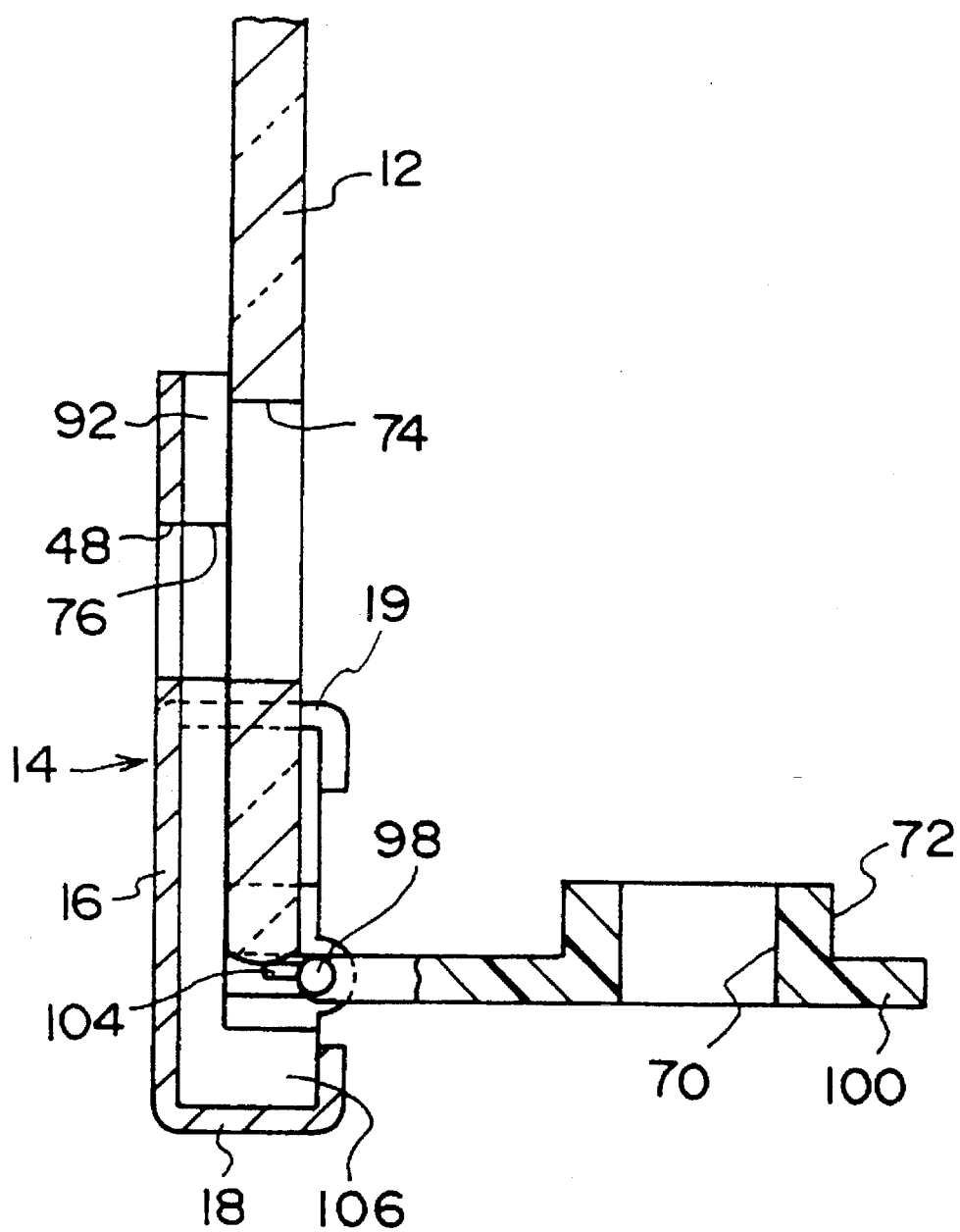
FIG. 11 is a sectional view showing a first state of mounting a door glass by using the glass holder according to the second embodiment.

The second holding plate 100 is pivoted downward to the open state shown in FIG. 11, and the lower edge of the door glass 12 is positioned on the base 106 with a triangular portion 12B formed in a vicinity of the mounting hole 74 of the door glass 12 is contacting the inclined guide surface 78 shown in FIG. 8. Since the holding space formed between the first holding plate 92 and the second holding plate 100 is widened, a worker can easily insert the door glass 12.

Figure 12:
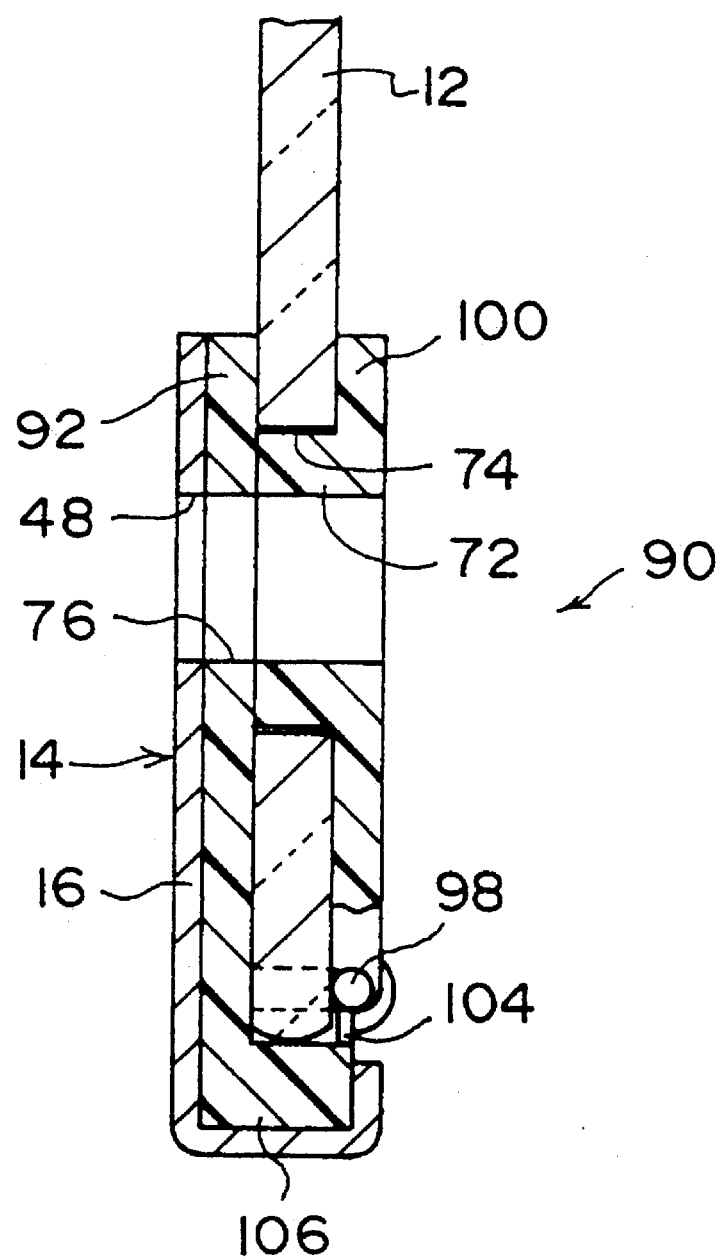
FIG. 12 is a sectional view showing a second state of assembling the door glass to the glass holder according to the second embodiment.

When the tip, i.e., a vertex portion of the triangular portion 12B of the door glass 12 contacts the engagement tongue 104, the engagement tongue 104 receives a force so that a rotational moment corresponding to the arm length acts on the center of rotation of the second holding plate 100. As a result, the second holding plate 100 is pivoted upward, so that the second holding plate 100 contacts the door glass 12, and the boss 72 enters the mounting hole 74 as shown in FIG. 12. Accordingly, since the second holding plate 100 is automatically pivoted upward in the second embodiment, an operation for raising the second holding plate 100 is not needed.

Figure 13:
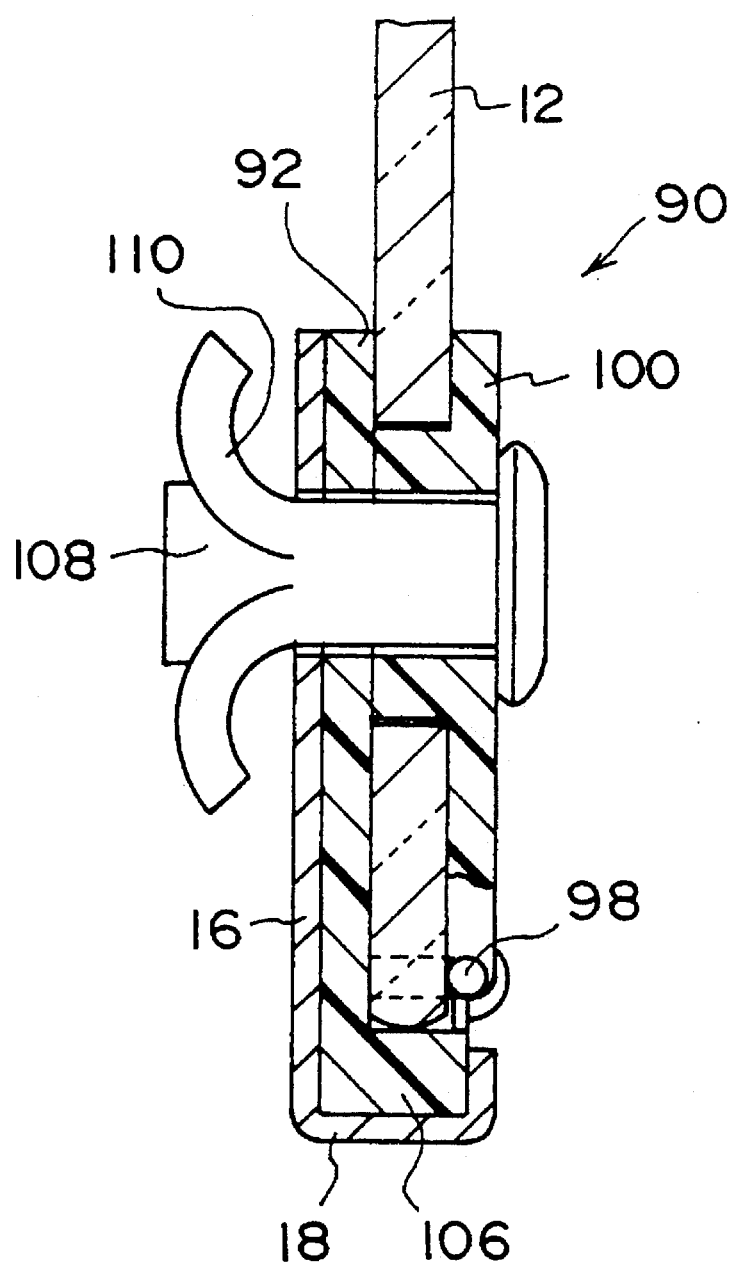
FIG. 13 is a sectional view showing a state in which the door glass is completely assembled by using the glass holder according of the second embodiment.
Figure 14:
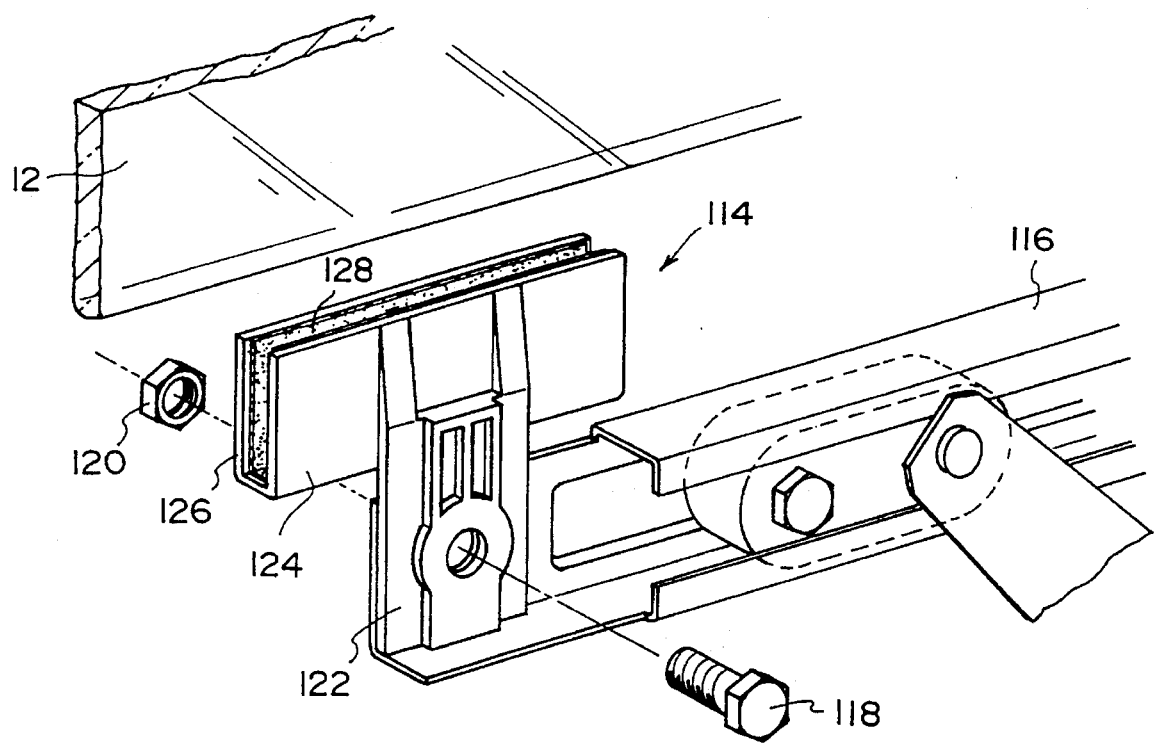
FIG. 14 is an exploded perspective view of a conventional glass holder.
Figure 15:
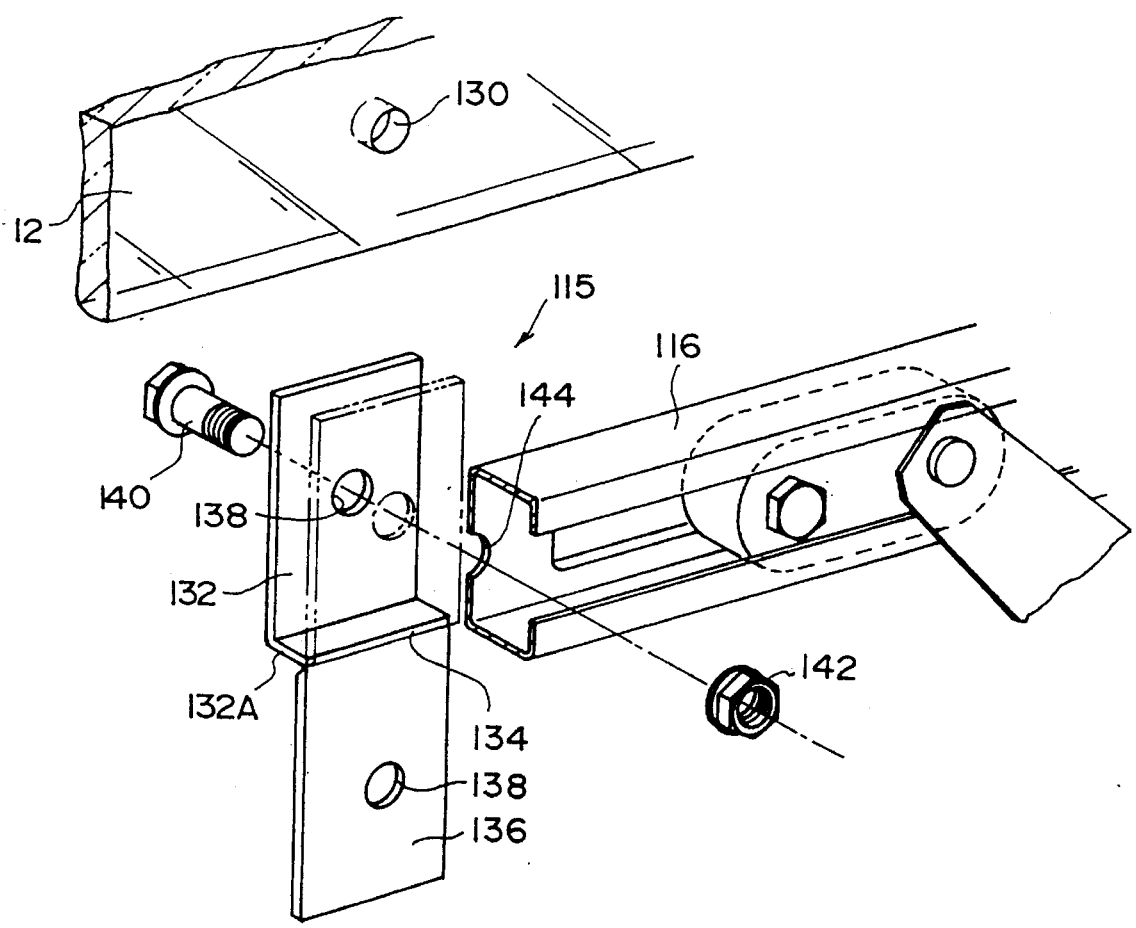
FIG. 15 is an exploded perspective view of another conventional glass holder.

Subsequently, as shown in FIG. 13, a rivet 108 is attached to fasten the guide channel 14, the glass holder 90 and the door glass 12. Since a metal collar 110 is attached to the rivet 108 in the present embodiment, the glass holders 90 can be made of a synthetic resin such as an unreinforced nylon resin or the like. A stepped bolt may be used instead of the rivet 108.

Since the glass holder according to the present invention has the above-described structure, the door glass can easily be assembled to the window regulator.

What is claimed is:

1. A glass holder for attachment to an elevating member of a window regulator which raises and lowers a door glass, said glass holder comprising:

a first holding plate having a through hole;

a second holding plate having a through hole and being pivotal to face said first holding plate to hold the door glass in cooperation with said first holding plate;

a fastening member being insertable into a mounting hole formed in the door glass and into said through holes formed in said first and second holding plates to fasten the door glass to said glass holder;

a hinge pivotally connecting said second holding plate to said first holding plate to allow said second holding plate to form a holding space with said first holding plate for holding the door glass; and an engagement tongue protruding from said second holding plate and into said holding space such that said second holding plate is pivoted toward said first holding plate when said engagement tongue is pressed by the door glass.

2. A glass holder according to claim 1, further comprising an urging hinge member which urges said second holding plate to pivot toward said first holding plate.

3. A glass holder according to claim 1, further comprising:

an elastic claw protruding from said first holding plate for engagement with a positioning hole formed in the elevating member to secure temporarily said glass holder to the elevating member, thereby axially aligning a mounting hole formed in the elevating member with said through hole formed in said first holding plate.

4. A glass holder for attachment to an elevating member of a window regulator which raises and lowers a door glass, said glass holder comprising:

a first holding plate having a through hole;

a second holding plate having a through hole and being provided to pivot to face said first holding plate to hold the door glass in cooperation with said first holding plate;

a fastening member being insertable into a mounting hole formed in the door glass and into said through holes formed in said first and second holding plates to fasten the door glass to said glass holder;

a hinge pivotally connecting said second holding plate to said first holding plate to allow said second holding plate to form a holding space with said first holding plate for holding the door glass;

an urging hinge member urging said second holding plate to pivot toward said first holding plate; and an elastic claw protruding from said first holding plate for engagement with a positioning hole formed in the elevating member to secure temporarily said glass holder to the elevating member, thereby axially aligning a mounting hole formed in the elevating member with said through hole formed in said first holding plate.

5. A glass holder for a window regulator including an elevating member having a mounting hole to move a door glass having a mounting hole, said glass holder comprising:

a first holding member having a through hole;

a second holding member having a through hole which is aligned with said through hole of said first holding member, said second holding member pivotally opposing said first holding member to hold the door glass between said first holding member and said second holding member;

a fastening member being insertable into the mounting hole of the door glass and into said through holes of said first and second holding members to fasten the door glass to said glass holder;

a hinge member pivotally supporting said second holding member with respect to said first holding member to allow said second holding member to form a holding space with said first holding member for holding the door glass; and a tongue member projecting from said second holding member and into said holding space, said tongue member being adapted to pivot said second holding member toward said first holding member when said tongue member is depressed by the door glass.

6. A glass holder according to claim 5, further comprising an urging hinge means for urging said second holding member to pivot said second holding member toward said first holding member.

7. A glass holder according to claim 5, further comprising:

an elastic claw protruding from said first holding member for engagement with a positioning opening formed in the elevating member to secure temporarily said first holding member to the elevating member, thereby axially aligning the mounting hole of said elevating member with said through hole formed in said first holding member.

* * * * *